United States Patent
Epstein et al.

[11] 4,011,403

[45] Mar. 8, 1977

[54] FIBER OPTIC LASER ILLUMINATORS

[75] Inventors: Max Epstein, Highland Park; Michel E. Marhic, Evanston, both of Ill.

[73] Assignee: Northwestern University, Evanston, Ill.

[22] Filed: Mar. 30, 1976

[21] Appl. No.: 671,750

[52] U.S. Cl. .............................. 358/209; 350/96 R; 331/94.5 R; 331/DIG. 1; 358/225; 358/98

[51] Int. Cl.² ......................................... H04N 5/26

[58] Field of Search ............ 354/126; 178/7.1, 7.2, 178/DIG. 2; 350/96 R; 331/94.5 R, 94.5, DIG. 1

[56] References Cited

UNITED STATES PATENTS 3,538,919   11/1970   Meyer ............................. 331/94.5

OTHER PUBLICATIONS

Edmund Scientific Co., Catalog No. 741, Sept. 1973, pp. 148–149.

*Primary Examiner*—Robert L. Richardson
*Attorney, Agent, or Firm*—Michael G. Berkman; Glenn E. Klepac

[57] ABSTRACT

An object-illuminating and imaging system utilizing, in combination, a laser beam as a light source and an optical fiber as a light transmitter. Light-focusing means are provided and the focused laser beam is, in a preferred embodiment of the invention, directed to impinge upon a single, small-diameter optical fiber. Sensing means such as film or a television-type camera may be used visually to reproduce and/or display the illuminated object. A light-flow-disruptive means such as a vibrator, acting upon a collimated line of illumination, serves to reduce objectionable speckle effects ordinarily present in coherent light beams, thus providing enhanced clarity as viewed and in imaged reproductions.

21 Claims, 2 Drawing Figures

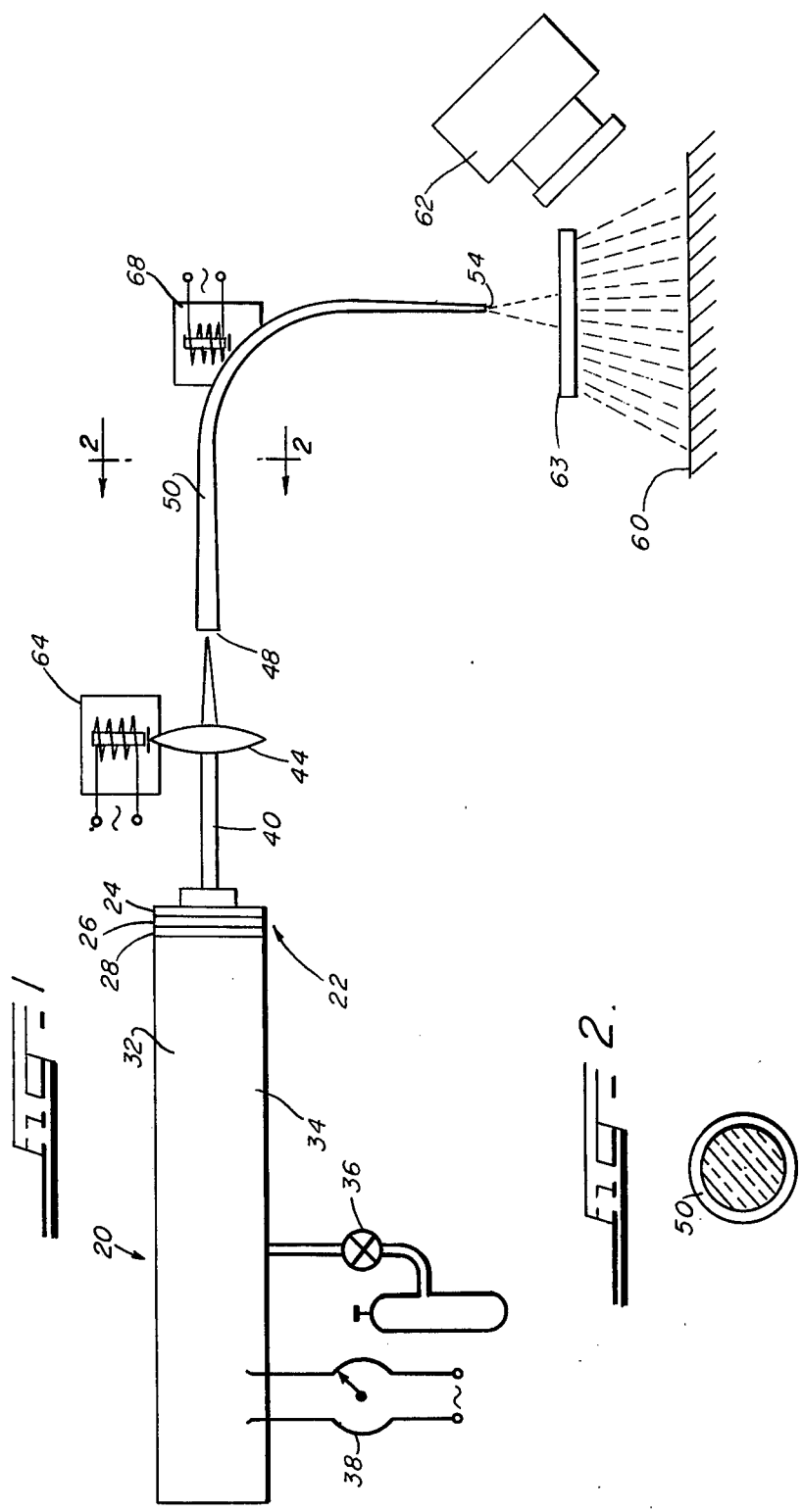

FIBER OPTIC LASER ILLUMINATORS

The invention described herein was made in the course of work under a grant from the Department of Health, Education and Welfare.

BACKGROUND OF THE INVENTION

The present invention relates to improved systems for the illumination, viewing and imaging of objects and of remote cavities or spaces. More particularly, the invention is directed to an illuminating system utilizing, in combination, a laser beam as a light source and an optical fiber as a light carrier or transmitter. In preferred embodiments, the invention finds utility in fiberscopes such as medical endoscopes used to view relatively inaccessible spaces or body cavities. Such instruments oridinarily include means for illumination and for imaging, relying upon the properties of optical fibers and one or more ancillary channels. In medical endoscopy the need for small size instruments is obvious.

Miniaturized fiberscopes require that the transmission of light be through a limited number of optical fibers and yet provide illumination adequate for viewing and for photography. In current hypodermic fiberscopes for medical applications, the light transmitting optical fibers occupy nearly one-half of the total cross sectional area of the instrument. Further reduction of the cross section of the illuminating structure is limited by the imaging of a conventional incoherent light source on the optical fibers. Physical demands inherent in providing adequate illumination at a remote location, and utilizing fiber optics, pose special problems in medical instruments where the cross sectional area allocated to the light carrying elements must necessarily be limited. Several approaches to the solution of the problem have been investigated by prior researchers but no completely satisfactory solution has been offered. It is, accordingly, the aim of the present invention to obviate many of the shortcomings of prior art fiberscopic illuminating systems and to provide an improved optical illuminating viewing, and imaging system which is uniquely adapted for incorporation in endoscopes and similar devices.

SUMMARY OF THE INVENTION

In accordance with the present invention there is provided a novel combination utilizing a laser beam as a light source, and an optical fiber as a light carrier.

It is an important feature of the invention that it provides an apparatus and technique whereby an ion laser source produces white light from a balanced three color power output for "in color" viewing and recordation.

In another form of the invention a helium-neon laser may be used to provide a single color, for example red light, which, in conjunction with a television camera and monitor or in conjunction with a photographic film can provide visualization in black and white. While "white" light is preferred in that it makes possible the viewing and recording in color, under some circumstances the advantages of true color rendition may be dispensed with in favor of lower cost lasers which provide single color viewing or black and white prints.

A preferred embodiment of the invention fosters a technique of light generation in which the light source can be focused onto and transmitted through an extremely small diameter optical fiber. All of the light is used; none is wasted.

The technique and apparatus of the invention provide an extremely efficient and practical illuminating system which may be used in endoscopic medical instruments, and the device itself is small enough for convenient use in both hospitals and medical offices.

The present invention will be described more fully herebelow with reference to the drawing.

BRIEF DESCRIPTION OF THE DRAWING

FIG. 1 is a schematic representation of the apparatus of the invention, including optional auxiliary elements, the role or function of each of which will become clear upon consideration of the following detailed description; and FIG. 2 is a cross-sectional view of the optical fibre of the apparatus taken on the line 2—2 of FIG. 1.

DESCRIPTION OF THE PREFERRED EMBODIMENTS

The method of the invention is to use a laser in conjunction with a special broad-band output mirror so as to achieve simultaneously lasing at three different wave lengths. Through proper adjustment of gas pressure and of discharge current in the laser assembly, a balanced output of three colors is obtained, to produce white light. The laser beam itself is focused onto an optical conductor, preferably a single optical fiber, and the fiber carries and delivers the light to a remote cavity or object to be viewed or photographed.

In order to reduce the "speckle" effect inherent in coherent light sources of the type described, a diffuser may be interposed in the light flow path at a location between the light source and the object viewed. One suitable such diffuser consists of a polytetrafluoroethylene (Teflon) lens or disc. It is an important feature of the invention that there is also provided a second type of apparatus or technique for the minimization of speckle effects. Specifically, it has been found that the speckle effect may be markedly reduced by vibrating one of the elements in the optical path traversed by the light beam. For example, the focusing lens may be vibrated or, alternatively, the optical fiber itself. Any preferred vibration producing means such as an electro-mechanical device or a piezo electric device may be used.

The alignment of the laser beam with the optical fiber is simplified, in one form of the present invention, by using a tapered fiber. Specifically, an optical fiber 75 cm long was fabricated with a 5 mm diameter at one end and tapering over a length of 10 cm down to a 50-$\mu$m diameter. This tapered optical fiber provided illumination comparable to that obtained using a more conventional fiber and lens combination.

Referring now more particularly to the drawing in which a preferred embodiment of the invention is illustrated, there is depicted, schematically, a tri-color laser 20, for example, a krypton-ion laser (Spectra Physics Model 164) having a broad-band output mirror 22 formed with superimposed, multi-layer dielectric coatings 24, 26 and 28 so as to produce, simultaneously, lasing at three different wavelengths. The chamber 32 of the laser is filled with gas 34 and the gas pressure and the discharge current of the apparatus are adjusted 36, 38 to provide a balanced output at three different wavelengths, for example 476.2nm, 568.2 nm and 647.1 nm, to produce white light.

The light beam 40 emanating from the laser assembly is directed through a focusing lens 44 whereby the beam is focused onto the end 48 of a single optical fiber 50 having a diameter of 85 μm, the lens 44 having conveniently a 38 mm focal length. In the specific embodiment of the apparatus shown, the optical fiber 50 is 94 cm long and consists of F2 flint glass core and R6 soda lime cladding. Its numerical aperture is 0.57.

The light emanating from the remote end 54 of the optical fiber 50 is directed to provide illumination of the cavity or other object 60 to be viewed or photographed, using any suitable instrument 62. Optionally, as a means for reducing the speckle effect due to the coherent light source, a 0.25 mm thick Teflon (polytetrafluoroethylene) diffuser disc 63 is interposed between the end 54 of the fiber 50 and the object 60.

An important feature of a preferred embodiment of the invention is that there is provided an alternate means whereby the objectionable speckle effect may be minimized. In accordance with the invention any means whereby vibrations may be imparted to the collimating (focusing) illumination line serve to disrupt the coherency of the light and thereby to minimize the objectionable speckle effects. As indicated schematically in the drawing, the vibrations may be imparted to the focusing lens 44, vibrational motion either transversely of or parallelling the light path being effective. An electro-mechanical vibrator 64 indicated diagramatically as coupled to the lens 44 produces the required vibrations.

Alternatively, the vibration producing device 68 may be coupled directly to the optical fiber 50. Such an arrangement also being indicated schematically in the drawing. The vibration producing element may be an electro-mechanical device, a piezo electro device, or any other suitable mechanism. It has been found that the frequency of the vibrations is not critical and that the frequency of 60 cps provides the desired effect.

Adequate illumination of 10 $\mu$W/cm$^2$ for viewing and for color photography was obtained using 45 mW of white light from the laser 20 which was attenuated in the optical fiber 50 to 15 mW of radiant power. Computed fractional attenuation losses due to surface and internal transmission only were found to be 0.32, 0.37, and 0.46 for the corresponding red, green and blue colors, while the measured values were 0.60, 0.60 and 0.75, respectively, the difference being attributable to internal reflection losses.

Maximum white light from the apparatus described above was 150 mW. Outputs of over 3 W have been reported in the literature using mixed gases of argon and krypton. Such power levels are, however, still far below the power handling capability of glass optical fibers.

In applications where black and white displays are adequate, a very inexpensive He-Ne laser can be utilized effectively in accordance with the invention to obtain TV or photographic displays. The red light from a 3-mW He-Ne laser was transmitted through the same 94-cm optical fiber which rendered a radiant power of 0.25 mW through a 0.25 mm thick Teflon diffuser.

In accordance with the practice of the invention it has been found that when using a krypton gas laser, 3 mW of white light is sufficient adequately to illuminate an area of 8 inches by 8 inches at a distance of about 8 inches from the end of a 0.0035 inch diameter single optical fiber. The quantity of light transmitted through such a single optical fiber cannot be obtained from any prior existing incoherent source. Accordingly, it will be appreciated that the technique of the invention provides intense white light illumination through a single optical fiber of "negligible" cross sectional area.

An additional useful feature of the invention is that it may be used to produce an ultraviolet fiber optic laser illumination. Some fluorescent stain techniques utilized in medical procedures require the use of an illuminating source in the ultraviolet wavelength range. In endoscopic examinations, in particular, in the case of hypodermic fiberscopes, it is useful to obtain such an illumination through a single optical fiber. Using an unclad coarse fiber it has been found possible, in accordance with the present invention, to transmit ultraviolet light from an ion laser to obtain adequate illumination of fluorescent dyes injected into the body. Thus, very thin-hypodermic fiberscopes can be employed in the fluorescent stain techniques by using a single optical fiber illumination and multifiber imaging structure with micro lenses. Utilization of the technique described makes it possible to construct hypodermic fiberscopes of very small size, for example about 0.03 inch in diameter (gauge 20 or smaller).

It is to be understood that the foregoing detailed description of the preferred specific examples of the invention is provided for illustrative purposes only and is not to be construed as limiting the invention. Based upon the present disclosure there will occur to those skilled in the art obvious variations and modifications which fall within the spirit and scope of the invention as claimed.

What is claimed is:

1. Apparatus for providing laser illumination transmitting through an optical fiber for direct visualization of illuminated objects and for photographic recordation, said apparatus comprising
   a highly concentrated light source including a laser beam having coherent light characteristics,
   an optical fiber
   focusing means for directing said laser beam to impinge on said fiber for transmission therealong, and
   sensing means for visually reproducing objects illuminated by said laser beam.

2. The apparatus as set forth in claim 1 and further comprising light diffuser means interposed between said light source and objects illuminated thereby,
   said diffuser means being operative to reduce speckle effects normally associated with coherent light characteristics of said laser beam.

3. The apparatus as set forth in claim 1 and further comprising vibrator means, and means operatively coupling said vibrator means to a light-carrying component of said apparatus whereby said vibrator means causes vibration of said light-carrying component so as effectively to reduce speckle effects normally associated with coherent light characteristics of said laser beam.

4. The apparatus as set forth in claim 1 wherein said sensing means is light-sensitive film.

5. The apparatus as set forth in claim 1 wherein said sensing means is a television type camera.

6. The apparatus as set forth in claim 1 wherein said laser beam constitutes a monochromatic light source.

7. Apparatus for providing white light laser illumination through an optical fiber for direct visualization of illuminated objects and for photographic recordation, said apparatus comprising
   a highly concentrated light source including an ion laser, mirror means in the laser, means for balancing an output of said mirror means to provide simultaneous lasing at three different selectable wavelengths, thereby to produce a beam of coherent white light, an optical fiber, focusing means for directing said laser beam to impinge on said optical fiber for transmission therealong, thereby to provide white light illumination for object visualization directly, for photographic recordation including recordation in color, and for visualization through imaging fiber optical systems.

8. The apparatus as set forth in claim 7 and further comprising gas pressure adjustment means for regulating gas pressure in said light source, a discharge current adjustment means, thereby to provide a balanced output of three colors to produce white light.

9. The apparatus as set forth in claim 7 wherein said optical fiber is a single fiber.

10. The apparatus as set forth in claim 7 and further comprising diffuser means interposed between said light source and objects illuminated thereby, said diffuser means being operative to reduce speckle effect associated with coherent white light, said diffuser means consisting essentially of a polytetrafluoroethylene disc.

11. The apparatus as set forth in claim 10 wherein said polytetrafluoroethylene disc has a thickness of about 0.25 mm.

12. The apparatus as set forth in claim 7 wherein said optical fiber is a fiber of about 85 $\mu$m in diameter and is constituted of an F-2 flint glass core and R6 soda lime cladding.

13. The apparatus as set forth in claim 7 and further comprising interference means for disrupting light emanating from said light source, thereby to reduce speckle effects ordinarily associated with a beam of coherent white light, said interference means comprising vibrating means operatively coupled to said apparatus to effect vibrations in a collimating line of illumination projected from said ion laser through said optical fiber.

14. The apparatus as set forth in claim 13 and further comprising means coupling said vibrating means to said optical fiber for vibration thereof.

15. The apparatus as set forth in claim 13 wherein said vibration means is coupled to said focusing means to act thereon.

16. The apparatus as set forth in claim 13 wherein said vibrating means comprises an electro-mechanical device.

17. The apparatus as set forth in claim 13 wherein said vibrating means is a piezo electric device.

18. The apparatus as set forth in calim 1 wherein said fiber is a single fiber having a tapered configuration and decreasing continuously along a segment of its length from a larger to a smaller diameter.

19. The apparatus as set forth in claim 18 wherein the larger diameter is about 5 mm and the smaller diameter is about 50 $\mu$m.

20. The apparatus as set forth in claim 9 wherein said fiber is a single fiber having a tapered configuration and decreasing continuously along a segment of its length from a larger to a smaller diameter.

21. The apparatus as set forth in claim 20 wherein the larger diameter is about 5 mm and the smaller diameter is about 50 $\mu$m.

* * * * *